Patented Oct. 15, 1940

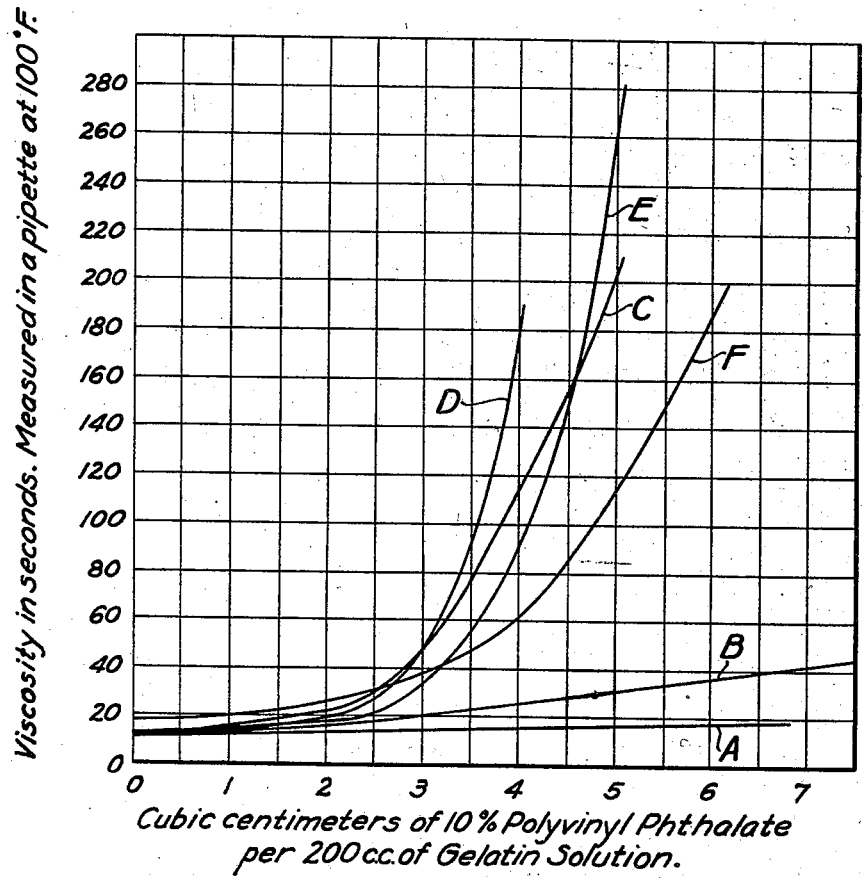

2,218,255

UNITED STATES PATENT OFFICE 2,218,255

INCREASING THE VISCOSITY OF GELATIN SOLUTIONS

Walter J. Weyerts and Charles Walter Wiederhold, Rochester, N. Y., assignors to Eastman Kodak Company, Rochester, N. Y., a corporation of New Jersey Application July 12, 1939, Serial No. 284,042

11 Claims. (Cl. 95—7)

This invention relates to photographic gelatin and emulsions and particularly to a method for increasing the viscosity of gelatin solutions and emulsions.

It is often desirable to increase the viscosity of a given gelatin solution without appreciably increasing the total solids content of the solution. A number of substances can be added to a gelatin solution to increase its viscosity by a tanning or hardening action on the gelatin, which may be undesirable. Pectin and zirconium salts increase the viscosities of gelatin solutions without the tanning action and have been used with fair success. Pectin is required in relatively large quantities to obtain any appreciable increase in viscosity. About three grams of pectin per hundred grams of gelatin in solution will increase its viscosity ten to twelve per cent. The addition of small quantities of zirconium nitrate to gelatin solutions greatly increases their viscosities, but the resulting viscosities are considerably affected by changes in pH. The viscosity of a certain gelatin solution of pH 5.4 was measured. Its viscosity was nearly tripled by the addition of 0.5 g. $Zr(NO_3)_4.5H_2O$ to each hundred grams gelatin in solution, but the viscosity dropped to about half of this value when the pH was raised to 6.5. For pH values above 7, however, the pH effect is not great. Zirconium nitrate solutions should be rather dilute, about 1% $Zr(NO_3)_4.5H_2O$, when stirred into a gelatin solution; otherwise coagulated lumps are formed which can be redispersed only with difficulty. The relatively large quantity of dilute zirconium nitrate solution required, in many cases, may cause an unwanted dilution of the gelatin.

It is an object of the present invention to overcome these difficulties and to provide a method for increasing the viscosity of a gelatin solution or emulsion without appreciably increasing its total solids content. A further object is to provide a novel photographic gelatin having an increased viscosity.

The accompanying drawing is a series of graphs illustrating the increase in viscosity obtained in gelatin solutions according to our invention.

We have found that the addition of polyvinyl phthalate to a gelatin solution or emulsion greatly increases its viscosity. Polyvinyl phthalate is insoluble in water but many of its salts are soluble. It may be dissolved in solutions of sodium, potassium, or ammonium hydroxides, morpholine, β-diethylamino ethyl alcohol, pyridine and others. The increase of viscosity which is obtained by adding a given amount of polyvinyl phthalate solution to a gelatin solution depends somewhat on the nature of the gelatin itself, such as the degree of hydrolysis, gel strength, and acidity or hydrogen ion concentration. The effect is descreased by presence of soluble calcium salts, etc.

The following may be taken as a typical example.

A 5% solution of gelatin having a pH of 6.5 and a viscosity of 17.4 seconds in a pipette type viscosimeter at 100° F. was prepared. Additions of polyvinyl phthalate sodium salt were made to this solution and the viscosity measured after each addition with the following results:

| | Viscosity | Increase |
|---|---|---|
| | Seconds | Percent |
| 1 cc. of 10% polyvinyl phthalate per 200 cc. of 5% gel | 20 | 15 |
| 2 cc. of 10% polyvinyl phthalate per 200 cc. of 5% gel | 25.5 | 46 |
| 3 cc. of 10% polyvinyl phthalate per 200 cc. of 5% gel | 37 | 110 |
| 4 cc. of 10% polyvinyl phthalate per 200 cc. of 5% gel | 61 | 250 |
| 5 cc. of 10% polyvinyl phthalate per 200 cc. of 5% gel | 113 | 550 |
| 6 cc. of 10% polyvinyl phthalate per 200 cc. of 5% gel | 186 | 965 |

This increase in viscosity of a 5% gelatin solution is illustrated by the graph labeled F in the accompanying drawing. As shown in the drawing, the viscosity rises rapidly with increase in the amount of polyvinyl phthalate added to the solution.

The increase in viscosity of a distilled water solution upon the addition of a 10% polyvinyl phthalate solution is indicated by the graph A, which indicates the slight increase in viscosity due to the polyvinyl phthalate solution itself. When the polyvinyl phthalate is added to a 0.2% gelatin solution, the resulting viscosity increase is indicated by the curve B. Increase in viscosity obtained upon addition of a 10% polyvinyl phthalate solution to a 0.5%, a 1%, a 2%, and a 5% gelatin solution is indicated, respectively, by curves C, D, E, and F. It is to be understood that these graphs are illustrative only, and that greater amounts of polyvinyl phthalate may be added to the gelatin, or that more concentrated gelatin solutions may be used.

Changes in pH of a mixture of gelatin solution and polyvinyl phthalate have very little effect on its viscosity between pH 5.5 and 6.5. Above pH 6.5 the viscosity becomes slightly lower with increasing pH. Varying amounts of polyvinyl phthalate may be added to the gelatin up to 100% or 200%, based on the weight of gelatin in the solution or emulsion; that is, the polyvinyl phthalate may be equal to or twice as great as the amount of gelatin. This is particularly true of dilute gelatin solutions. The polyvinyl phthalate itself can be used in 5, 10 or even 15% solutions. Solutions containing more than 15% are somewhat viscous for easy handling.

When polyvinyl phthalate is added to a gelatin solution the maximum effect on viscosity is obtained immediately after the solution is well mixed. If the solution is held at 40° C. for several hours a slight loss in viscosity is usually noticed but it is about the same loss that would occur in a plain gelatin solution under similar conditions. Polyvinyl phthalate may be used in many kinds of photographic emulsions without affecting their photographic properties, as well as in plain gelatin solutions. The gelatin solutions containing polyvinyl phthalate may be used as backing or overcoating layers in photographic film to prevent abrasion or static, or dyes may be incorporated therein for use as filter or antihalation layers. The polyvinyl phthalate layers made according to our invention may be coated on sensitive or on finished photographic film. Coatings made from gelatin solutions containing polyvinyl phthalate dry down to a clear pellicle.

It is to be understood that the examples included in the present application are illustrative only and that the polyvinyl phthalate can be added to gelatin solutions or emulsions in amounts and in solvent mixtures not herein specifically described. Our invention is to be taken as limited only by the scope of the appended claims.

What we claim is:

1. The method of increasing the viscosity of photographic gelatin which comprises dissolving in a solution thereof an appreciable amount of a water soluble salt of polyvinyl phthalate.

2. The method of increasing the viscosity of a gelatino-silver halide emulsion which comprises dissolving in a solution thereof an appreciable amount of a water soluble salt of polyvinyl phthalate.

3. As a new product, a photographic gelatin containing an appreciable amount of polyvinyl phthalate dissolved therein.

4. A photographic gelatin containing an appreciable amount of polyvinyl phthalate dissolved therein and having greater viscosity than untreated gelatin.

5. A photographic gelatin containing an appreciable amount up to 200% by weight of polyvinyl phthalate dissolved therein and having greater viscosity than untreated gelatin.

6. A gelatino-silver halide emulsion containing an appreciable amount up to 10% by weight of polyvinyl phthalate dissolved therein and having greater viscosity than an untreated gelatino-silver halide emulsion.

7. A photographic film having thereon a light-sensitive emulsion layer and a gelatin layer containing polyvinyl phthalate dissolved therein.

8. A photographic gelatin solution containing approximately 1% of gelatin and an appreciable amount up to 200% of polyvinyl phthalate dissolved therein.

9. The method of increasing the viscosity of a gelatin solution, which comprises dissolving therein an appreciable amount of a water-soluble salt of polyvinyl phthalate.

10. The method of increasing the viscosity of a dilute gelatin solution, which comprises dissolving therein an appreciable amount up to 200% of a water-soluble salt of polyvinyl phthalate.

11. A photographic gelatin solution containing an appreciable amount up to about 5% of gelatin in water, and having dissolved therein an appreciable amount up to 200% of a water-soluble salt of polyvinyl phthalate, said gelatin solution having a greater viscosity than the untreated gelatin solution.

WALTER J. WEYERTS.
CHARLES W. WIEDERHOLD.